United States Patent
Kathe

(10) Patent No.: US 11,097,230 B2
(45) Date of Patent: Aug. 24, 2021

(54) PROCESS FOR PREPARING AN OIL-IN-WATER MIXTURE AND APPARATUS FOR PREPARING AN OIL-IN-WATER MIXTURE

(71) Applicant: Endress+Hauser Conducta GmbH+Co. KG, Gerlingen (DE)

(72) Inventor: Ulrich Kathe, Ludwigsburg (DE)

(73) Assignee: Endress+Conducta GmbH+Co. KG, Gerlingen (DE)

( * ) Notice: Subject to any disclaimer, the term of this patent is extended or adjusted under 35 U.S.C. 154(b) by 35 days.

(21) Appl. No.: 16/678,483

(22) Filed: Nov. 8, 2019

(65) Prior Publication Data
US 2020/0147562 A1    May 14, 2020

(30) Foreign Application Priority Data

Nov. 9, 2018   (DE) ..................... 10 2018 128 064.5

(51) Int. Cl.
*B01F 11/02* (2006.01)
*B01F 3/08* (2006.01)
*B01J 19/10* (2006.01)

(52) U.S. Cl.
CPC .......... *B01F 3/0819* (2013.01); *B01F 3/0865* (2013.01); *B01F 11/0208* (2013.01); *B01F 11/0258* (2013.01); *B01J 19/10* (2013.01); *B01F 2003/0842* (2013.01); *B01J 2219/0877* (2013.01)

(58) Field of Classification Search
CPC ............................. B01F 11/02; B01F 11/0258

USPC ......................................................... 366/127
See application file for complete search history.

(56) References Cited

U.S. PATENT DOCUMENTS

| 3,451,379 A * | 6/1969 | Kuribayshi | ............ F02M 27/08 123/1 A |
| 2009/0165654 A1* | 7/2009 | Koenig | .............. B01D 19/0094 96/175 |
| 2009/0166177 A1* | 7/2009 | Wenzel | ................. B01F 3/0819 204/157.62 |

FOREIGN PATENT DOCUMENTS

| DE | 952707 B1 | 11/1956 |
| DE | 9307960 U1 | 9/1993 |
| DE | 102006039963 A1 | 2/2008 |
| DE | 102010022437 A1 | 10/2011 |

* cited by examiner

*Primary Examiner* — David L Sorkin
(74) *Attorney, Agent, or Firm* — Mark A. Logan; Endress+Hauser (USA) Holding Inc.

(57) ABSTRACT

The present disclosure relates to a method for preparing an oil-in-water mixture having a predeterminable oil concentration which can be used as a reference mixture in the determination of oil concentrations of oil-in-water mixtures, comprising the steps of arranging at least one oil storage element in a container, feeding a predeterminable amount of a water-containing fluid into the container; and introducing ultrasonic waves into the fluid that are emitted in the direction of the oil storage element covered by the fluid, wherein the oil received in the oil storage element is released from the oil storage element by means of ultrasonic waves acting on the oil storage element and is distributed in the fluid. The present disclosure further relates to an apparatus for preparing an oil-in-water mixture.

16 Claims, 1 Drawing Sheet

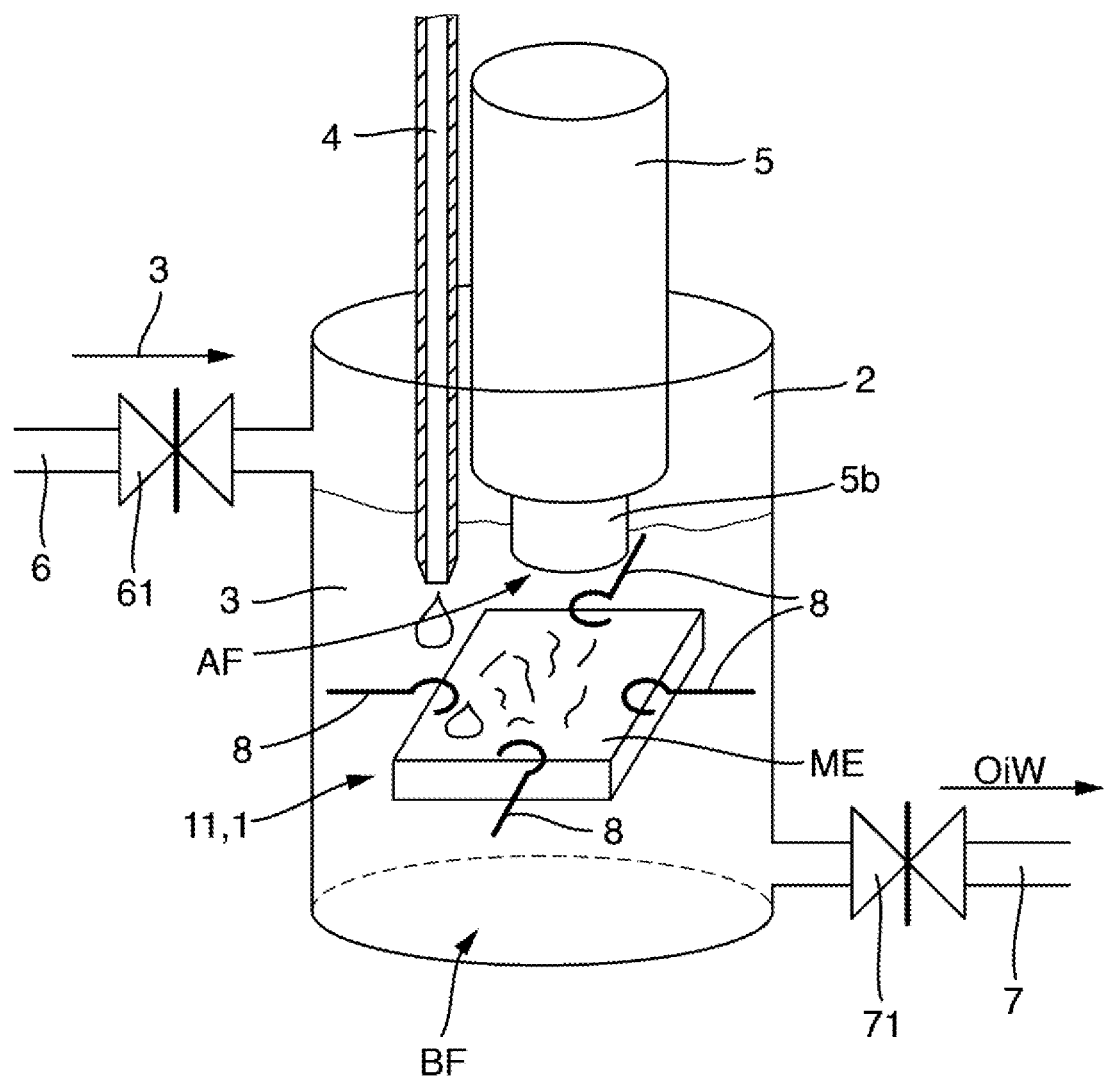

PROCESS FOR PREPARING AN OIL-IN-WATER MIXTURE AND APPARATUS FOR PREPARING AN OIL-IN-WATER MIXTURE

CROSS-REFERENCE TO RELATED APPLICATION

The present application is related to and claims the priority benefit of German Patent Application No. 10 2018 128 064.5, filed on Nov. 9, 2018, the entire contents of which are incorporated herein by reference.

TECHNICAL FIELD

The present disclosure relates to a method for preparing an oil-in-water mixture having a predeterminable oil concentration which can be used as a reference mixture in the determination of oil concentrations of oil-in-water mixtures, and to an apparatus for preparing an oil-in-water mixture.

BACKGROUND

The oil concentration of an oil-in-water mixture is an important measurement, especially for mineral oils. Distillation products of fossil raw materials are usually referred to as mineral oils. They can consist of aliphatic, aromatic and naphthenic hydrocarbons. Moreover, mineral oils may contain proportions of organic sulfur and nitrogen compounds. The presence of mineral oil in the environment has a high risk potential, for example for open bodies of water and/or groundwater. It is therefore often necessary to determine and/or monitor the oil concentration of an oil-in-water (OiW) mixture, especially, by means of analytical measuring methods. Since mineral oils differ greatly with regard to their composition, this also applies to their chemical and/or physical properties so that it is difficult to specify a universally usable analytical measuring method for determining the oil concentration of an oil-in-water mixture. Various methods are known in the prior art which are respectively sensitive to a particular physical or chemical property of the oil and are therefore more or less suitable depending on the qualitative oil composition.

Examples of analytical measuring methods known from the prior art for determining the oil concentration of an oil-in-water mixture include, inter alia,
- online light scattering,
- the UV fluorescence method which is specific to polycyclic aromatic hydrocarbons,
- UV absorption,
- mid-infrared (MIR) spectroscopy using a quantum cascade laser specific to CH3 groups,
- molecular spectroscopy using visible light (VIS fluorescence), and
- methods for determining total organic carbon (TOC) which are specific to carbon atoms.

A typical property of mineral oils is their poor miscibility with water. Two phases therefore form in the presence of large amounts of oil in the water, the lighter and thus floating phase generally being the oil phase. In practice, depending on the oil concentration, an oil-in-water mixture generally consists of one of the following three mixture types:

Mixture type 1: Oil which floats on the water and which may contain traces of water, also referred to as oil on water (OoW). The oil concentration is typically in the upper two-digit percentage range.

Mixture type 2: A fine distribution of oil droplets in water, for example a suspension. The oil concentration is typically less than 10%, especially, less than one percent.

Mixture type 3: Water which may contain dissolved oil in the parts-per-million (ppm) range.

An oil-in-water mixture may also be present as a combination of these mixture types with delimitable phases of the mixture types, wherein phases that have a larger oil concentration respectively float on the phases that have a smaller oil concentration.

Standard mixtures with known oil concentrations usually have to be used for process adjustment purposes for analytical measuring methods which are suitable for determining the oil concentration for mixture types 2 or 3. Such standard mixtures are prepared from the mixture of a known amount of water with a known amount of oil. The mixture should be finally present as a solution (for very low concentrations) or as an emulsion with sufficient homogeneity and should have, especially, sufficient long-term stability. Because of the principally poor miscibility of oil and water, the mixture must therefore be subjected to a homogenization method.

A method known from the prior art for homogenizing oil-in-water mixtures comprises dispersing according to the rotor-stator principle (Müller, Eugen, Methods of Organic Chemistry, volume I/2, General Laboratory Practice, p. 150, Georg Thieme Verlag Stuttgart, 1959). The shearing forces which occur in the process break the oil into very small droplets which are also distributed in the water in the process. However, long-term stability of the emulsion required for use as a standard mixture is achieved in many cases only by the addition of emulsifiers and stabilizers. However, these substances may also be detected in the oil-in-water analysis and therefore falsify the analysis.

Another method known from the prior art for homogenizing oil-in-water mixtures comprises dispersing by ultrasonic treatment (Jirgensons, B., Straumanis, M., A Short Textbook of Colloid Chemistry, p. 176, Verlag J. F. Bergmann, 1949). In this case, high-frequency mechanical vibrations are transferred into an oil-water mixture with the aid of a sonotrode. For this purpose, the sonotrode has an emission surface which emits ultrasonic waves and at which the sonotrode reaches its highest effectiveness. However, the quantitative suspension of oil in water by ultrasonic treatment is very time-consuming and energy-consuming, especially, because it is difficult to bring oil floating on the fluid near the emission surface of the sonotrode immersed in the fluid and thus to its optimum range of action. A combination with axially acting stirrers also requires a long duration of action of the sonotrode. In addition, the mixture is strongly heated by the high energy input and/or the long action times. In case of heating-induced evaporation and/or nebulization into the environment, not all of the specified amount of oil and/or water is emulsified into the mixture. This falsifies the oil concentration of the mixture. In extreme cases, the cavities caused by the combination of high energy inputs and long action times may even lead to part of the oil which has not yet been emulsified being ejected from the fluid. This also falsifies the oil concentration of the mixture.

SUMMARY

The object underlying the present disclosure is therefore to provide an improved way of preparing a long-term stable and homogeneous standard oil-in-water mixture with a predeterminable oil concentration.

The object is achieved by a method for preparing an oil-in-water mixture and by an apparatus for preparing an oil-in-water mixture.

As regards the method, the object is achieved by a method for preparing an oil-in-water mixture having a predeterminable oil concentration which can be used as a reference mixture in the determination of oil concentrations of oil-in-water mixtures, comprising the steps of
- arranging at least one oil storage element in a container, feeding a predeterminable amount of a water-containing fluid into the container;
- introducing ultrasonic waves into the fluid that are emitted in the direction of the oil storage element covered by the fluid, wherein the oil held in the oil storage element is released from the oil storage element by means of ultrasonic waves acting on the oil storage element and is distributed in the fluid.

The present disclosure has the following advantages:
- Floating of the oil on the water can be reliably prevented by means of the oil storage element. This avoids the use of additional stirrers.
- The oil storage element may be arranged optimally with respect to the ultrasonic transmitter. This facilitates the emulsification of the oil in water.
- The action times may be considerably shortened. Firstly, this is an advantage in terms of process engineering. Secondly, the above-explained problem of falsification of the oil concentration is avoided.
- The water concentration in the fluid is known.

The fluid may, especially, be substantially oil-free water. One possibility is, for example, the use of oil-free tap water.

The fluid may additionally contain emulsifiers the proportion of which is less than 5%.

A further possibility is the use of a fluid which is already an oil-in-water mixture. In this case, the fluid itself is already a defined oil standard which has a known oil and water concentration. In the method according to the present disclosure, further oil may be added to this standard within the scope of a standard addition.

Based on the predeterminable amount of the water-containing fluid and the predeterminable amount of oil and, where applicable, the oil concentration of the fluid in the case of the standard addition described above, the predeterminable oil concentration of the oil-in-water mixture can be adjusted. The predetermined amount is, for example, in each case a predetermined volume. Depending on the embodiment (see explanation below), the oil storage element can be arranged before or after feeding the predeterminable amount of the water-containing fluid.

In a development of the method according to the present disclosure, an oil storage element is used which has a superoleophilic material, especially, fibrous-matted polymer wool.

Superoleophilic substances are distinguished by their property of being extremely water-repellent and at the same time excellently wetting for oils. They have therefore been in use for oil binding or separating oil-in-water mixtures for a long time. DE 1020 100 224 37 describes an oil binder which consists of a superoleophilic fibrous-matted polymer wool and is used as an oil binder for oil-contaminated buildings, company premises, land areas and for applications in bodies of water. It is manufactured by the company DEUREX and sold under the name "DEUREX PURE". The use of superoleophilic substances in the preparation of standard mixtures for analytical measuring methods for determining the oil concentration of an oil-in-water mixture, especially, as an oil storage element, is particularly advantageous.

In one embodiment of the method according to the present disclosure, a predeterminable amount of oil is introduced into the oil storage element, especially, by means of an oil metering apparatus, the oil storage element being substantially completely covered by the fluid before the ultrasonic waves are introduced into the fluid, and wherein in case that the predeterminable amount of oil is introduced into the oil storage element arranged in the container, the fluid is fed into the container after arranging the oil storage element, and wherein in case that the predeterminable amount of oil is introduced into the oil storage element arranged outside of the container, the fluid is fed into the container before or after arranging the oil storage element.

In this embodiment, a predeterminable amount of oil is thus introduced into the oil storage element, especially, by means of an oil metering apparatus. In this case, the oil storage element can be either first arranged in the container and then subsequently, especially by means of the metering apparatus, a predeterminable amount of oil required for the respective standard mixture can be introduced into the oil storage element, and the fluid can then be fed in such a way that the oil storage element is completely covered by the fluid. Another possibility is to introduce into the oil storage element arranged outside of the container the predeterminable amount of oil required for the standard mixture into the oil storage element by means of a metering apparatus. In this case, the fluid can be fed into the container before or after the oil storage element is arranged. In case that the fluid is fed into the container before the oil storage element is arranged, it must be immersed sufficiently into the fluid in order to ensure sufficient coverage of the oil storage element by the fluid.

A further possibility is to use a pre-metered oil storage element with a known amount of oil already contained therein.

In a further embodiment of the method according to the present disclosure, an oil storage element is used which has a predetermined amount of oil before the oil storage element is arranged in the container.

Of course, this embodiment can also be combined with the previous embodiment, for example in that the oil storage element has a predetermined amount of oil before being arranged in the container and that a predeterminable amount of oil is additionally introduced into the oil storage element after arranging the oil storage element in the container. If no additional oil is to be introduced into the oil storage element arranged in the container, the fluid can basically also first be fed and the oil storage element can subsequently be arranged in the container containing the fluid.

In a development of the method according to the present disclosure, the ultrasonic waves are introduced into the fluid for an action time calculated such that the oil received in the oil storage element is substantially completely released from the oil storage element and distributed in the fluid during the action time.

The action time is, especially, not more than 10 minutes, preferably not more than 5 minutes.

In one embodiment of the method, the oil-in-water mixture is prepared as an oil-in-water emulsion having a substantially homogeneous oil droplet size and distribution or as a fluid with oil dissolved therein. It is therefore one of the initially mentioned mixture types 2 or 3 with the associated oil concentrations of at least less than 10%.

As regards the apparatus for preparing an oil-in-water mixture, the object is achieved by an apparatus for preparing an oil-in-water mixture having a predeterminable oil concentration which can be used as a reference mixture in the determination of oil concentrations of oil-in-water mixtures, comprising:

a container into which a predeterminable amount of a water-containing fluid can be, or has been, fed;

an oil storage element that can be arranged or is arranged in the container and into which a predeterminable amount of oil has been introduced or can be introduced;

an ultrasonic transmitter designed to emit ultrasonic waves in the direction of the oil storage element and act on the oil storage element covered by the fluid such that the oil received in the oil storage element is released from the oil storage element and distributed in the fluid.

The apparatus is designed, especially, for carrying out the method according to the present disclosure.

In one embodiment of the apparatus, the container is cup-shaped.

In an advantageous development of the apparatus, the oil storage element has a superoleophilic material, especially, fibrous-matted polymer wool, wherein the oil storage element is stable under the action of the ultrasonic waves during the action time.

Advantageously, the oil stored in the oil storage element is thus substantially completely released from the oil storage element during the action time without the oil storage element being destroyed, for example decomposed, under the action of the ultrasonic waves. The oil storage element is thus characterized by its simultaneous superoleophility and excellent resistance to the ultrasonic waves. As a result, the oil storage element can be, for example, reused so that, with the apparatus according to the present disclosure, different oil-in-water mixtures can be prepared successively with the same oil storage element.

In one embodiment of the apparatus, it comprises a metering apparatus by means of which the predeterminable amount of oil has been or can be introduced into the oil storage element arranged in the container.

In a further embodiment of the apparatus, the container has an inlet, which can be blocked, especially, by a valve unit and through which the predeterminable amount of the water-containing fluid has been or can be fed into the container.

In a further embodiment of the apparatus, the container has an outlet, which can be blocked, especially, by a valve unit and through which the oil-in-water mixture can flow out of the container.

In a further embodiment of the apparatus, the ultrasonic transmitter comprises a sonotrode which can be lowered into the container. On an end face of the sonotrode facing the oil storage element, the sonotrode has an emission surface emitting the ultrasonic waves.

In a development of the apparatus, the oil storage element is formed as a receiving mat with a mat plane which is or can be arranged substantially in parallel to a bottom surface of the container, especially, in a region of the container close to the bottom.

The receiving mat is therefore, for example, a substantially flat mat which extends, especially, substantially in the mat plane. In the context of this application, "flat" means that the dimension of the receiving mat in a direction perpendicular to the mat plane is at most 40% of the dimension of the receiving mat in a direction parallel to the mat plane. Preferably, the mat plane is or can be arranged substantially in parallel to a bottom surface of the container.

The receiving mat is preferably matched to the container in such a way that the mat plane of the receiving mat arranged in the container substantially completely extends over the cross-sectional area of the container that is parallel to the bottom surface.

In the context of this application, "close to the bottom" means that in relation to a region which is delimited by the bottom surface and an end part of the container (for example an opening) that is substantially opposite the bottom surface, the receiving mat is arranged at least in the first third adjoining the bottom surface, preferably in the first quarter of this region.

An arrangement of the receiving mat close to the bottom facilitates a uniform distribution of the oil into the fluid when it is released from the receiving mat with the ultrasonic wave transmitter. This development is particularly advantageous compared to the solution known from the prior art for preparing oil-in-water mixtures where, due to the oil phase initially floating on the fluid, very large amounts of action energy or durations of action and/or stirrers are required for a homogeneous oil (droplet) distribution.

In a preferred embodiment, the emission surface is arranged substantially directly adjacently to the oil storage element when the ultrasonic waves are emitted, wherein especially the emission surface is arranged substantially in parallel to the mat plane when the ultrasonic waves are emitted. This allows for an optimal utilization of the emission surface of the sonotrode.

In the context of this application, "directly adjacent" means that the distance between the oil storage element and the sonotrode is 1 to 100 mm, especially, 3 to 20 mm.

In a development, the oil storage element is releasably attachable to a wall of the container by means of at least one fastening element.

The oil storage element has, for example, at least one holding element which corresponds to the at least one fastening element and is releasably connectable thereto. The fastening or holding element is arranged on the oil storage element or the wall in such a way that the oil storage element can be inserted into the container at a predetermined insertion position and in a predetermined insertion location.

For example, the oil storage element is mechanically and/or magnetically attachable to the wall. In case of a mechanical attachment, the at least one fastening element and the holding element are, for example, eyelets and hooks corresponding thereto. Further mechanical solutions (screwing, clipping, etc.) are of course also possible. In case of a magnetic attachment, the at least one fastening element and the holding element have differently poled permanent magnets.

Fastening may also take place by means of an insert which is removable from the container and to which the oil storage element is releasably connectable. The insert should be heavy enough to not float on the fluid. The insert may also be releasably connected to the container (see already mentioned solutions: hooking, screwing, clipping, etc.).

BRIEF DESCRIPTION OF THE DRAWING

The present disclosure is explained in greater detail based on the following FIGURE which is not true to scale.

The following is shown:

FIG. 1 shows a perspective view of an embodiment of the apparatus according to the present disclosure.

DETAILED DESCRIPTION

FIG. 1 shows an embodiment of the apparatus according to the present disclosure which is designed to prepare sample emulsions and standard emulsions for the OiW analysis. This embodiment comprises a cup-shaped container 2 with an oil storage element 1 arranged therein, which is designed here as a receiving mat 11 of fibrous-matted polymer wool with superoleophilic properties. The receiving mat 11 is substantially planar. For example, the receiving mat 11 has a mat area of e.g. approximately 1 cm×1 cm=1 cm2 and a thickness (i.e., a width in the direction perpendicular to the mat plane) of approximately 0.2 cm.

The receiving mat 11 is releasably attachable to a wall of the container 2 by means of a plurality of fastening elements 8. Due to the felted consistency of the material of the receiving mat 11, it can be held firmly enough by means of, for example, hooks in order not to be detached from the wall during the subsequent ultrasonic treatment. The fastening elements 8 may be stainless steel wire hooks, for example. These hooks may be, on the one hand, crocheted through the material of the receiving mat 11 and, on the other hand, releasably attached to the inner wall of the container 2. The fastening elements 8 may also be attached to an insert which is removable from the container 2, the insert being designed to receive the receiving mat 11. The insert only has to be heavy enough so that it does not float. The insert may also be releasably connected to the container 2 (screwing, clipping, etc.). An arrangement of the receiving mat 11 in the container 2 close to the bottom in which the receiving mat is arranged directly adjacently to a bottom surface BF of the container 2 is preferred.

The apparatus further comprises an oil metering apparatus 4 which is designed for metering the predetermined amount of oil, for example a predetermined volume, into the receiving mat 11. Furthermore, the apparatus comprises an inlet 6 with a valve unit 61 by means of which the container 2 can be filled with a predeterminable amount, for example a required volume of a fluid 3 (mainly water). The fluid 3 must completely cover the receiving mat 11.

In case that the receiving mat 11 is directly connected or connectable to the container 2, the fluid 3 is filled in through the inlet 6 after metering the predetermined amount of oil. If the receiving mat 11 is fastened to an insert which can be removed from the container 2, the fluid 3 can also already be located in the container 2 before the receiving mat 11 loaded with the oil outside of the container 2 is put into the container 2.

An ultrasonic transmitter 5 which can be moved in the axial direction and has a sonotrode 5b is now immersed into the fluid 3 in such a way that the emission surface AF of the sonotrode 5b is arranged directly adjacently and as parallelly as possible to the mat plane ME of the planar receiving mat 11. The ultrasonic transmitter 5 or the sonotrode 5b is then switched on and the receiving mat 11 is subjected to ultrasound for an action time EZ of approximately 2 to 4 minutes. The oil-in-water mixture having a predeterminable concentration is then sufficiently homogenized and can flow out of the container 2 for example by means of an outlet 7 having a valve unit 71. The valve units 61, 71 at the inlet 6 or outlet 7 each comprise at least one valve which can be controlled, for example, by a control/evaluation unit.

In tests performed by the applicant, oil-in-water mixtures for different oils (for example, tetradecane, limonene and crude oil) were prepared with the method according to the present disclosure and/or apparatus according to the present disclosure and subsequently analyzed. A UP200St laboratory apparatus by Hielscher was used as the ultrasonic transmitter 5 in the tests. The distance between the emission surface AF of the sonotrode 5b and the receiving mat is 1 to 100 mm, preferably: 3 to 20 mm, with smaller distances being possible for higher ultrasonic powers. The UP200St laboratory apparatus has an ultrasonic power of 200 W and was equipped with an ultrasonic transducer S14D. The emission surface AF arranged at the tip of the sonotrode 5b has a diameter of 14 mm.

When preparing the mixtures, oil concentrations of 15 ppm-500 ppm TOC were weighed into fluid volumes of 200 ml and 500 ml. These are therefore weight concentrations, wherein the predeterminable oil concentration may, of course, also be present as a volume concentration, for example by predetermining a specific volume of the oil and a specific volume of the fluid. Homogenization or, respectively, emulsification was then carried out with the method according to the present disclosure and/or apparatus according to the present disclosure to prepare oil-in-water mixtures with these oil concentrations (15 ppm to 500 ppm). The prepared oil-in-water mixture was subsequently analyzed with a TOC analyzer in order to see whether the concentration determined therewith sufficiently matches the predetermined concentration. This was the case in all tests performed by the applicant; for example, in the case of a tetradecane emulsion having an initial weight of 200 ppm TOC, an oil recovery rate was achieved which deviates by less than 5% from 100%.

An important issue in the preparation of reference mixtures is their long-term stability. This defines how long they can be used as standards for analytical measuring methods. In the tests performed by the applicant, the emulsions or suspensions prepared with the method according to the present disclosure and/or apparatus according to the present disclosure were sufficiently stable for calibration purposes. For example, in the case of a 200 ppm tetradecane TOC, 95% were still recovered after 6 days.

The tests performed by the applicant thus demonstrate that oil-in-water mixtures having sufficient long-term stability can be prepared with sufficiently precisely predeterminable oil concentrations using the method according to the present disclosure and/or apparatus according to the present disclosure. The method and/or the apparatus is therefore perfectly suited for preparing mixtures which are used as reference mixtures in the analytical determination of oil concentrations of oil-in-water mixtures.

The invention claimed is:

1. A method for preparing an oil-in-water mixture having a predeterminable oil concentration, which can be used as a reference mixture in the determination of oil concentrations of oil-in-water mixtures, comprising:
   arranging an oil storage element in a container, wherein the oil storage element includes a superoleophilic fibrous-matted polymer wool;
   feeding a predeterminable amount of a water-containing fluid into the container; and
   introducing ultrasonic waves into the fluid which are emitted in the direction of the oil storage element covered by the fluid, wherein the oil in the oil storage element is released from the oil storage element by the ultrasonic waves acting on the oil storage element and is distributed in the fluid.

2. The method according to claim 1, further comprising:
   introducing a predeterminable amount of oil into the oil storage element using an oil metering apparatus,
   wherein the oil storage element is substantially completely covered by the fluid before the ultrasonic waves are introduced into the fluid,
   wherein in case that the predeterminable amount of oil is introduced into the oil storage element arranged in the container, the fluid is fed into the container after the oil storage element has been arranged, and wherein in case that the predeterminable amount of oil is introduced into the oil storage element arranged outside the container, the fluid is fed into the container before or after the oil storage element has been arranged.

3. The method according to claim 1, wherein an oil storage element is used which has a predetermined amount of oil before the oil storage element is arranged in the container.

4. The method according to claim 1, further comprising: calculating an action time during which the ultrasonic waves are introduced into the fluid, and wherein the oil in the oil storage element is substantially completely released from the oil storage element and distributed in the fluid during the action time.

5. The method according to claim 1, wherein an oil-in-water emulsion having a substantially homogeneous oil droplet size and distribution or a fluid with oil dissolved therein is prepared as the oil-in-water mixture.

6. An apparatus for preparing an oil-in-water mixture having a predeterminable oil concentration which can be used as a reference mixture in the determination of oil concentrations of oil-in-water mixtures, the apparatus comprising:
a container into which a predeterminable amount of a water-containing fluid can be fed;
an oil storage element including a superoleophilic fibrous-matted polymer wool, wherein the oil storage element is arranged in the container and is embodied to store a predeterminable amount of oil; and
an ultrasonic transmitter designed to emit ultrasonic waves in the direction of the oil storage element and act on the oil storage element covered by the fluid in such a way that the oil in the oil storage element is released from the oil storage element and distributed in the fluid.

7. The apparatus according to claim 6, wherein the container is cup-shaped.

8. The apparatus according to claim 6, wherein the oil storage element is stable under the action of the ultrasonic waves during the action time.

9. The apparatus according to claim 6, further comprising: a metering apparatus by which the predeterminable amount of oil has been, or can be, introduced into the oil storage element arranged in the container.

10. The apparatus according to claim 6, wherein the container has an inlet which can be blocked by a valve unit and through which the predeterminable amount of the water-containing fluid has been, or can be, fed into the container.

11. The apparatus according to claim 10, wherein the container has an outlet which can be blocked by a valve unit and through which the oil-in-water mixture can flow out of the container.

12. The apparatus according to claim 6, wherein the ultrasonic transmitter includes a sonotrode which can be lowered into the container and has an emission surface emitting the ultrasonic waves on an end face of the sonotrode facing the oil storage element.

13. The apparatus according to claim 6, wherein the oil storage element is shaped as a receiving mat having a mat plane which is, or can be, arranged substantially in parallel to a bottom surface of the container in a region of the container close to the bottom.

14. The apparatus according to claim 12, wherein the emission surface is arranged substantially directly adjacently to the oil storage element when the ultrasonic waves are emitted, and
wherein the emission surface is arranged substantially in parallel to the mat plane when the ultrasonic waves are emitted.

15. The apparatus according to claim 6, wherein the oil storage element is releasably attachable to a wall of the container by means of at least one fastening element.

16. A method for preparing an oil-in-water mixture having a predeterminable oil concentration, the method comprising:
providing an apparatus for preparing the oil-in-water mixture, including:
a container into which a predeterminable amount of a water-containing fluid can be fed;
an oil storage element including a superoleophilic fibrous-matted polymer wool, wherein the oil storage element is arranged in the container and is embodied to store a predeterminable amount of oil; and
an ultrasonic transmitter designed to emit ultrasonic waves in the direction of the oil storage element and to act on the oil storage element covered by the water-containing fluid in such a way that the predeterminable amount of oil in the oil storage element is released from the oil storage element and distributed in the fluid;
introducing the predeterminable amount of oil into the oil storage element using an oil metering apparatus;
feeding the predeterminable amount of a water-containing fluid into the container thereby covering the oil storage element; and
introducing ultrasonic waves into the water-containing fluid which are emitted in the direction of the oil storage element, wherein the predeterminable amount of oil in the oil storage element is released from the oil storage element by the ultrasonic waves acting on the oil storage element and is distributed in the fluid.

\* \* \* \* \*